Oct. 22, 1929.  G. PRODROMOS  1,732,590
DETACHABLE WHEEL RIM
Filed May 26, 1927
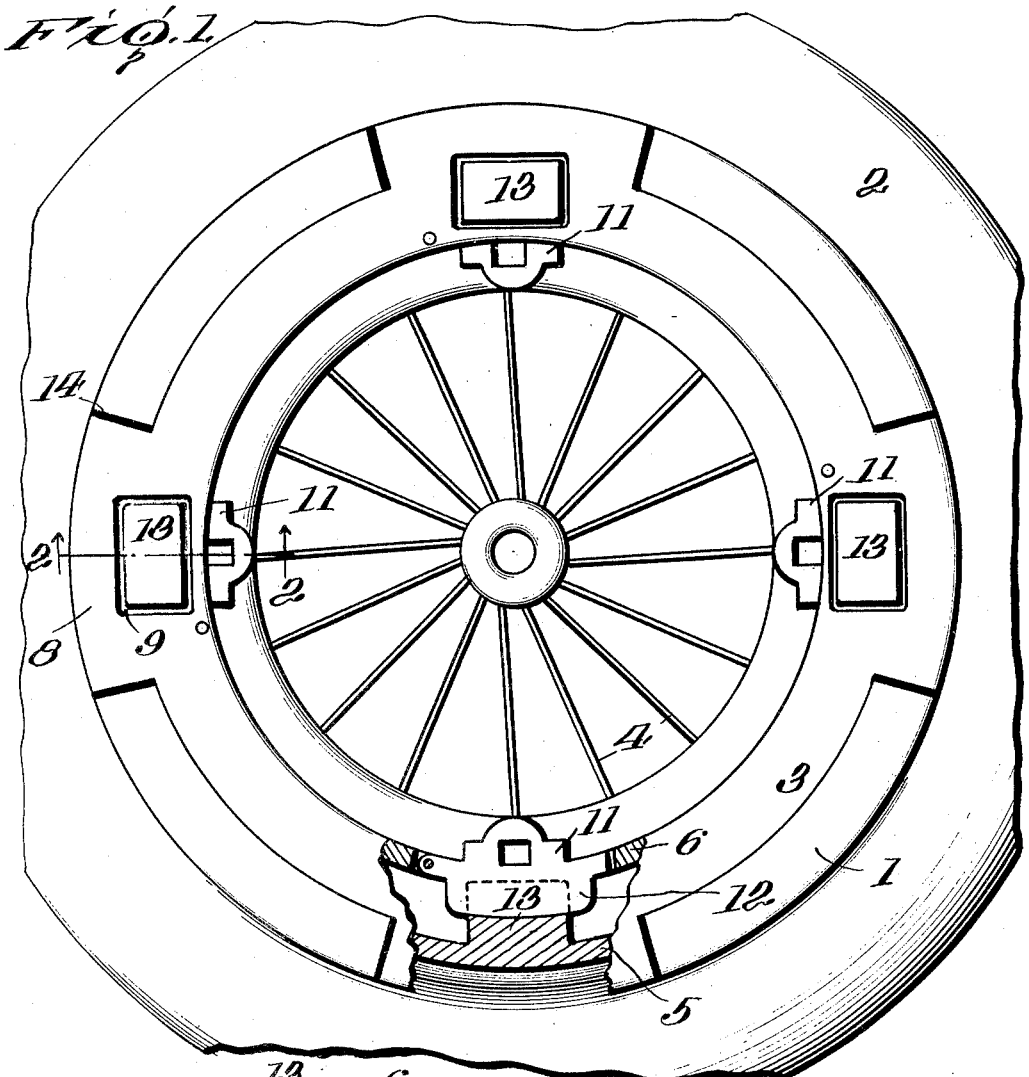
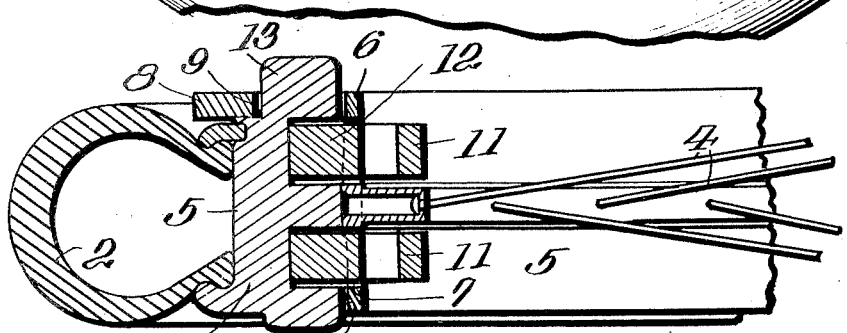
Inventor
GEORGE PRODROMOS.
By M. K. Saunders
Attorney Patented Oct. 22, 1929

1,732,590

UNITED STATES PATENT OFFICE

GEORGE PRODROMOS, OF WINSTON-SALEM, NORTH CAROLINA, ASSIGNOR, BY MESNE ASSIGNMENTS, OF ONE-HALF TO STELLA COCORES, OF WINSTON-SALEM, NORTH CAROLINA

DETACHABLE WHEEL RIM

Application filed May 26, 1927. Serial No. 194,383.

This invention relates to detachable wheel rims and the object of my invention is to provide a wheel rim and felly with cooperating parts so that the rim may be easily and quickly removed from the felly with a minimum amount of effort.

Another object of my invention is to provide a detachable wheel rim of strong construction having means for fastening it to the felly which will be positive in operation.

I accomplish the above and other objects of the invention, which will be apparent as the description proceeds, by means of the construction shown in the accompanying drawings in which Figure 1 is a plan view of one form of my invention, parts being shown in section;

Figure 2 is a section on the line 2—2 of Figure 1.

On the drawings, in which like reference characters indicate like parts on all the figures thereof, 1 indicates the detachable rim carrying the tire 2, the felly being indicated by 3 which is carried by the spokes 4.

The felly consists of a band 5 which is formed with outturned continuous flanges 6 and 7 on the edges thereof. The outer flange 6 is provided with a plurality of spaced extensions 8 having openings 9 therein. The inner flange 7 is cut away, as shown at 10, along lines in line with and corresponding to the openings 9.

The band 5 of the felly is formed with a plurality of openings 11 disposed around the periphery thereof at intervals corresponding to the distances between the openings 9 and the cutouts 10 of the flanges 6 and 7. Pivoted in the walls of these openings 11 and frictionally engaging with the walls thereof are latches 12 which serve to fasten the rim to the felly as will appear more fully as the description proceeds.

The detachable rim 1 is provided with integral lugs 13 on its internal periphery. The lugs are E-shaped in cross-section and the number and their distance apart corresponds to those of the openings 9, the cutouts 10 and the latches 12.

The rim 1 is formed on its edges with outer and inner peripheral flanges, the outer flange being cut away as shown at 14 to accommodate the extensions 8 and thus form a flush construction when the parts are in their operative relation.

The method of attaching the rim to the felly and of detaching it therefrom, it is believed will be clear with a few words of explanation. In practice, when it is desired to attach the rim to the wheel felly, the latches 12 are turned on their pivots out of their position in the openings 11 in the felly band 5. The rim is then placed on the exterior of the felly by aligning the lugs 13 with the cutouts 10 and the openings 9, the rim then being easily slipped over the felly. The parts are then fastened to each other by turning the latches to cause them to engage under the heads of the E-shaped lugs 13. To remove the rim from the wheel, the reverse operation occurs, after which the tire may be easily slipped off of the rim.

While I have shown a construction in which there are four lugs and four latches, it is obvious that three only, or any other desired number, may be provided.

The foregoing description applies to the form of my invention which is particularly adapted for cars of light construction, that form of my invention which is particularly adapted for cars of a heavier type being shown in my copending application Serial No. 361,683, filed May 9, 1929.

It is thus apparent that my improved detachable rim is particularly adapted for use on small wheels carrying relatively small tires and that it provides a convenient mode of attaching a rim to a wheel, the operation being expeditiously performed.

While I have referred to certain parts as being integral with each other, it is obvious that these parts may be made separate from each other and secured thereto in any suitable way without departing from the spirit of my invention.

Having thus described my invention, what I claim as new is and desire to secure by Letters Patent:—

1. Means for detachably connecting a rim and a wheel, said wheel having a band and a flange connected thereto, a plurality of lugs fixed to the rim, latches pivoted to said wheel and cooperating with said lugs, said wheel having openings in the band thereof for the housing of the latches, and other openings in the flange thereof for the reception of the end of the lugs.

2. Means for detachably connecting a rim and a wheel, said wheel having a band and flanges at both sides thereof, said band and flanges having openings therein, latches pivoted in the walls of the band openings, lugs on said rim cooperating with said latches, said lugs extending through the openings in the flanges.

In testimony whereof I have hereunto signed my name.

GEORGE PRODROMOS.